Aug. 30, 1932.   J. FORREST ET AL   1,873,958
PURIFIER
Filed May 2, 1930

Inventors
J. Forrest
A. C. Brenchley
by
Attorney

Patented Aug. 30, 1932

1,873,958

UNITED STATES PATENT OFFICE

JAMES FORREST, OF MILWAUKEE, AND ASBURY C. BRENCHLEY, OF WEST ALLIS, WISCONSIN, ASSIGNORS TO ALLIS-CHALMERS MANUFACTURING COMPANY, OF MILWAUKEE, WISONSIN, A CORPORATION OF DELAWARE

PURIFIER

Application filed May 2, 1930. Serial No. 449,134.

The present invention relates in general to improvements in the art of separating and grading material, and relates more specifically to improvements in the construction and operation of combined purifiers and graders for granular substances such as partially reduced grain.

An object of the invention is to provide new and useful improvements in granular material purifying and separating devices, whereby the efficiency of such devices is enhanced to a maximum.

Another object of the invention is to provide a purifier having a casing provided with an inlet for material to be purified in an end portion thereof, a movable screen extending lengthwise in said casing, a movable series of troughs mounted over said screen adjacent the end of said casing opposite said inlet, said casing providing a space above said screen of increasing area extending from a point adjacent said inlet toward the casing end opposite said inlet and means for producing a flow af gaseous fluid through said screen, said means communicating with said space adjacent the section of greatest area thereof.

It is customary in the flour milling industry, to utilize a so-called purifier for the purpose of removing dust, chaff and other impurities from whole or partially reduced grain, and to grade granules or the broken particles of grain as to size. These purifiers are ordinarily provided with a screen or sieve, and with means for delivering material to and from the screen, and for removing the lighter substances with the aid of an air current. While the prior devices of this character are quite satisfactory insofar as grading of the material passing through the screen is concerned, they are relatively inefficient for properly grading the oversize product which fails to penetrate the screen openings, and for removing the fine dust and chaff.

It is a more specific object of the present invention to provide a purifier which will more effectively free the material treated, from impurities, and which will also more accurately grade the purified product, than has heretofore been possible.

A clear conception of one embodiment of the invention and of the mode of operating devices built in accordance therewith, may be had by referring to the drawing accompanying and forming a part of this specification in which like reference characters designate the same or similar parts in the several views.

Figure 1:
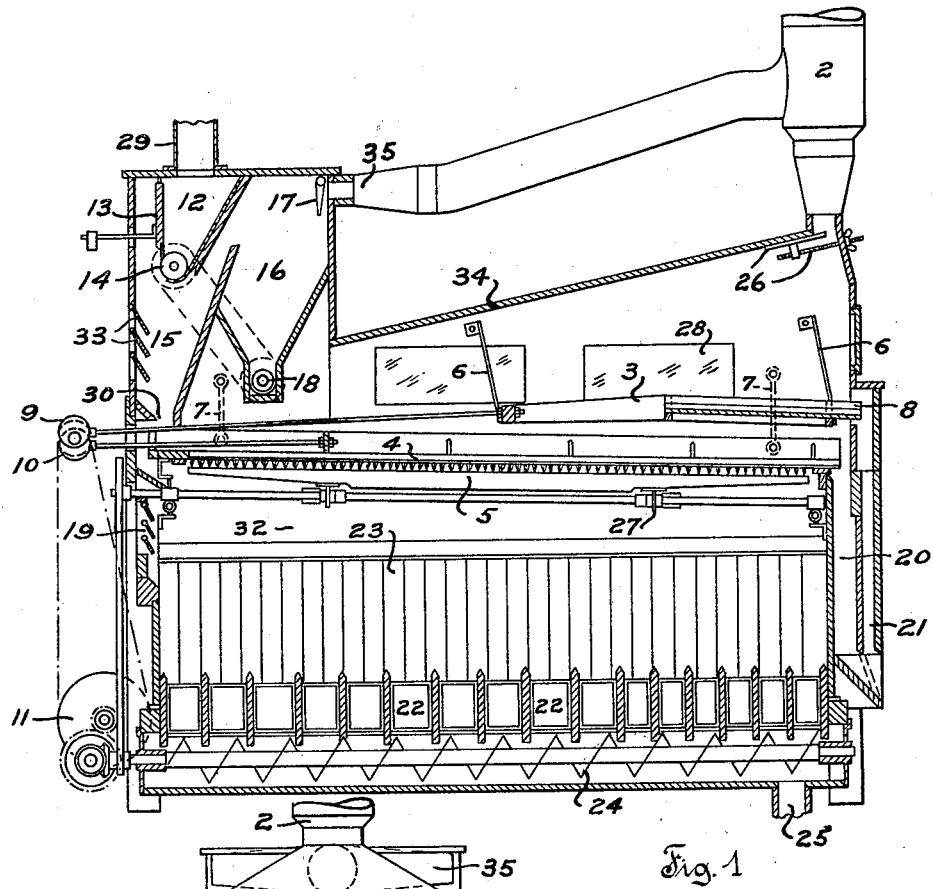
Fig. 1 is a longitudinal vertical section through an improved purifier, showing the driving mechanism thereof diagrammatically.

The improved purifier specifically illustrated in the drawing comprises in general a reciprocable sieve or screen 4; means for delivering material upon one end of the screen; means for grading and discharging material passing through the screen; and means for inducing a flow of air through all portions of the screen. The screen 4 is disposed within a housing 34 and is movably supported by a series of suspension links 7. The screen is longitudinally reciprocable by means of an eccentric 10 operable by driving mechanism 11. One or more elongated brushes 5 are movable transversely across the bottom of the screen 4 by means of conveyer chains 27 which are also operable by the driving mechanism 11.

Figure 2:
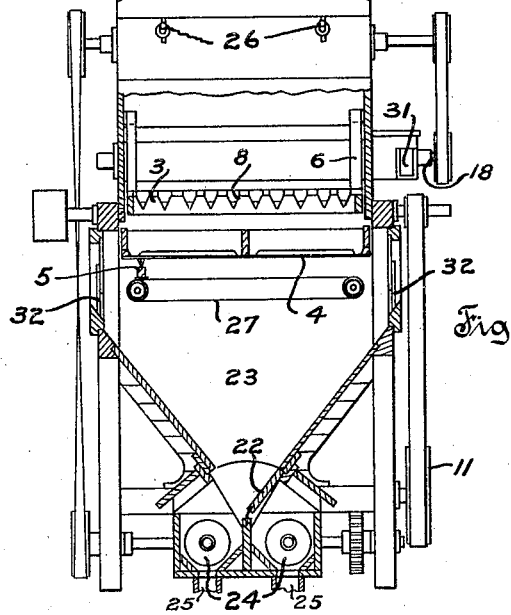
Fig. 2 is a part sectional end view of the purifier, looking toward the discharge end of the apparatus.

The material to be graded is supplied to a hopper 12 through a spout 29. The lower discharge end of the hopper 12 is provided with a feed roll 14 with which a laterally movable wall 13 of the hopper is cooperable in order to control the quantity of material delivered to the screen. Located beneath the hopper 12 and feed roll 14, is a preliminary separating chamber 15 to which controllable quantities of air may be admitted past adjustable shutters 33, and the lower portion of the chamber 15 is provided with a delivery opening 30 directed toward the receiving end of the screen 4. The chamber 15 is bounded on the right as viewed in Fig. 1, by a wall the upper portion of which is spaced from the adjacent wall of the hopper 12, so as to provide a passage connecting the preliminary separating chamber 15 with the secondary separating chamber 16. The chamber 16 is located directly above a screw conveyer 18 which is adapted to discharge particles deposited in the path thereof, from the purifier through a delivery spout 31, see Fig. 2. The upper end of the secondary settling chamber 16 is communicable with a suction passage 35 past an adjustable valve 17, and the suction passage 35 communicates directly with a suction fan or other suction producing means through the piping 2.

Disposed above the discharge end of the screen 4 remote from the material receiving end thereof, is a group of V-shaped troughs 8 which are supported upon a frame 3, and are spaced apart laterally. The frame 3 is movably supported by means of suspension reeds 6 and the troughs 8 are slightly inclined longitudinally, as shown. The frame 3 is reciprocable by means of an eccentric 9 mounted upon the same shaft which supports the eccentric 10, but angularly advanced with respect to the eccentric 10 so that the frame 3 is simultaneously but oppositely reciprocated relative to the screen 4. The lower discharge ends of the troughs 8 communicate with a spout 21 for delivering material received by gravity from within the troughs 8, from the purifier.

Disposed beneath the screen 4 is a separating chamber 23 to which air may be admitted through adjustable shutter mechanism 19 located at the feed end of the purifier, or past vertically adjustable slides 32 located at the opposite sides of the machine, or through lower openings controllable by means of adjustable plates 22. The disposition of the air inlet openings should preferably be such that a substantially uniform flow of air is produced upwardly through the entire screen 4, the flow of air being induced by the suction within the piping 2 and the velocity of the flow being controllable by means of an adjustable air control 26. The machine may also be provided with windows 28 at the opposite sides thereof for the purpose of observing the operation of the separating mechanism. Located beneath the separating chamber 23 is a set screw conveyers 24 to either of which material may be delivered by swinging the adjustable plates 22 in the proper direction. The conveyer screws 24 are provided with discharge spouts 25, and the delivery end of the screen 4 likewise communicates with a discharge spout 20 for conducting the oversize material from the top of the screen away from the purifier.

During normal operation of the purifier, the material to be treated is delivered from the spout 29 to the hopper 12 and is discharged from the hopper 12 over the feed roll 14 in the form of a continuous flat stream. As the sheet of entering material gravitates through the chamber 15, the lighter particles are removed by air entering the chamber 15 past the shutters 33, and are carried into the secondary chamber 16. In the chamber 16 the velocity of the air current is suddenly somewhat diminished, and relatively heavy particles immediately settle by gravity into the path of the conveyer screw 18 and are removed. The finer dust and chaff is withdrawn through the passage 35 and the piping 2.

The material which reaches the bottom of the chamber 15 is delivered upon the receiving end of the screen 4 through the opening 30, and is advanced longitudinally of the screen by virtue of the constant reciprocation and slight inclination thereof. As the material advances along the screen 4, the air admitted past the shutters 19, slides 32, and plates 22, passes upwardly through the chamber 23 and through the screen 4 and this current of air removes other fine particles of dust and chaff and carries the same past the air control 26 to the piping 2. The brush 5 is being periodically brought into engagement with the under side of the screen 4 and prevents pieces of material from lodging in and clogging the openings of the screen.

Simultaneously with this movement of the screen 4 to advance material longitudinally thereof, the trough supporting frame 3 is being reciprocated in the opposite direction, thereby tending to counterbalance vibrations resulting from the rapid reciprocation of the screen 4. It will be apparent that the air current passing upwardly through the screen 4 is more intense at the discharge end of the screen than at the receiving end thereof, and this relatively intense current will elevate relatively heavy material together with the remaining lighter particles, from the upper screen surface. This heavier material is carried upwardly through the constricted spaces between the parallel V-troughs 8, and during the passage of the air currents through these intervening spaces the velocity thereof is further augmented. As the air current passes beyond the upper edges of the troughs 8, the velocity thereof is again suddenly reduced, and the heavier particles being carried by the air, drop by gravity into the troughs 8 and are eventually delivered from the lower ends of these troughs to the spout 21 by virtue of the longitudinal reciprocation and inclination of the troughs 8. The particles of dust and chaff passing off from the receiving end of the screen are carried along the space above screen 4 of increasing area to points above the troughs 8 whereby reason of the increased area of said space the velocity of the carrying gaseous fluid is sufficiently reduced to permit of settling of such dust and chaff onto the troughs 8 and thereby further enhancing the purifying efficiency of the device.

The material which passes through the screen 4 gravitates through the chamber 23 and is ultimately delivered from the machine by the conveyers 24 through the discharge spouts 25. This material may be readily graded by proper adjustment of the plates 22. By setting the plates 22 near the feed end of the machine in one direction with respect to the longitudinal central plane of the machine, and those at the discharge end of the machine in the opposite direction with respect to said plane, any desired degree of grading of the material delivered through the screen 4, may be secured. The oversize material which fails to pass through the screen 4 and to be otherwise removed therefrom, is delivered over the discharge end of the screen 4 and from the machine through the spout 20.

From the foregoing description it will be apparent that the reciprocable troughs 8, by virtue of their reciprocation in a direction opposite to that of the screen 4, tend to counterbalance vibrations set up by the reciprocating screen. The troughs 8 should be disposed at a proper height above the screen 4 so as to produce the desired results, and these troughs may be readily constructed of sheet metal bent into V-shape and having a triangular strip of wood located in the bottom of each trough. The troughs 8 will effectively remove a grade of material which could not heretofore be removed, and the entire operation of the machine can readily be observed through the windows 28. The valve 17 and control device 26, as well as the adjustable shutters 33, 19, the slides 32, and the plates 22, permit accurate control of the machine and also enable uniform distribution of the air current, so as to produce any desired degree of grading of the material. The suction induced within the piping 2 serves to effectively remove dust and chaff, and thereby thoroughly purifies the product.

It should be understood that it is not desired to limit the invention to the exact details of construction and to the precise mode of operation herein shown and described, for various modifications within the scope of the claims may occur to persons skilled in the art.

It is claimed and desired to secure by Letters Patent:

1. In a purifier, a casing having an inlet for material to be purified in an end portion thereof, a movable screen mounted in said casing, a movable series of troughs mounted over said screen adjacent the casing end remote from said inlet, said casing having a space above said screen that is isolated from said inlet and of increasing area extending from a point adjacent said inlet toward the casing end opposite said inlet, and means for producing a flow of gaseous fluid through said screen and a flow past said inlet, said means communicating with said inlet and communicating with said space at a point in said casing remote from said inlet.

2. In a purifier, a casing having an inlet for material to be purified in an end portion thereof, reciprocable separating means extending lengthwise in said casing, a reciprocable baffle and collecting means mounted over said separating means adjacent the casing end remote from said inlet, means for simultaneously reciprocating said separating and said baffle means, said casing having a space above said separating means that is isolated from said inlet and of increasing area extending from a point adjacent said inlet toward the casing end opposite said inlet, and means for producing a flow of gaseous fluid through said separating means and a flow past said inlet, said means communicating with said inlet and communicating with said space at a point in said casing remote from said inlet.

In testimony whereof, the signatures of the inventors are affixed hereto.

JAMES FORREST.
ASBURY C. BRENCHLEY.